United States Patent
Horres et al.

(10) Patent No.: US 7,514,027 B2
(45) Date of Patent: Apr. 7, 2009

(54) PROCESS FOR MANUFACTURING PRODUCTS OF MINERAL WOOL, IN PARTICULAR MONOLAYER AND MULTILAYER PRODUCTS

(75) Inventors: Johannes Horres, Ladenburg (DE); Joachim Mellem, Hockenheim (DE)

(73) Assignee: Saint-Gobain Isover, Courbevoie (FR)

( * ) Notice: Subject to any disclaimer, the term of this patent is extended or adjusted under 35 U.S.C. 154(b) by 653 days.

(21) Appl. No.: 11/059,636

(22) Filed: Feb. 17, 2005

(65) Prior Publication Data

US 2006/0179892 A1      Aug. 17, 2006

(51) Int. Cl.
*B27N 3/04*      (2006.01)
*B27N 3/14*      (2006.01)

(52) U.S. Cl. ...................................... 264/116; 264/112
(58) Field of Classification Search ........................ None
See application file for complete search history.

(56) References Cited

U.S. PATENT DOCUMENTS 2,702,069 A * 2/1955 Lannan ........................ 264/116
3,004,878 A * 10/1961 Tomlinson ................... 162/142
3,050,427 A * 8/1962 Games et al. ................ 442/370
3,669,638 A * 6/1972 Wong et al. .................. 264/115
4,097,209 A * 6/1978 Garrick et al. ............. 425/82.1
5,246,653 A * 9/1993 Horres ........................ 264/113

* cited by examiner

*Primary Examiner*—Mary Lynn F Theisen
(74) *Attorney, Agent, or Firm*—Nixon & Vanderhye PC (57) ABSTRACT

Products of mineral wool, in particular monolayer and multilayer products of rock wool, are manufactured wherein the mineral wool material of a primary mat is mechanically comminuted by a combined beating and cutting process into mineral wool flakes of a predetermined size and subsequently recombined for forming a final mat. By such a treatment of the mineral wool material, practically any inhomogeneities and imperfections in the primary mat are eliminated, i.e., they are not present any more in the final mat. The process of the invention thus results in the final mat in products having a three-dimensional, isotropic fiber structure, which brings about a noticeable economy in the bulk density, at an at least equivalent quality in comparison with conventional crimped products.

16 Claims, 6 Drawing Sheets

PROCESS FOR MANUFACTURING PRODUCTS OF MINERAL WOOL, IN PARTICULAR MONOLAYER AND MULTILAYER PRODUCTS

BACKGROUND

1. Technical Field

The invention relates to a process for manufacturing products of mineral wool in accordance with the opening parts of claim 1, as well as monolayer and multilayer products in accordance with the opening parts of claims 19 and 21.

2. Related Art

Various processes for manufacturing mineral fibers are known and in use, such as fiberization by internal centrifugation (so-called TEL technique), external centrifugation processes such as the cascade centrifugation process (so-called REX technique), blast drawing process etc. In all of these known processes, the fibers to be produced are introduced by means of large flow rates of a mixture of air and combustion gases, which are necessary for fiberization, into a collection chamber, often referred to as a chute. For producing bonded mineral wool products, the fibers are provided with a binder while passing the chute. In the chute, moreover, other process-relevant substances may be added, such as dust binding agents, hydrophobizing agent, and the like.

The fibers thus obtained are collected and separated from the accompanying air/gas flow on a moving, perforated element constituting one of the delimitations of the chute. When the fibers are collected on the perforated element, endless mats are formed which predetermine the corresponding properties of the subsequent product in respect of weight per unit area, width, fiber orientation, and homogeneity. These properties cannot be modified in essence any more later on so that orientations of the fibers in the mat or inhomogeneities in the subsequent product generated upon collection from the chute are predetermined unless the mat is later on split or doubled, or separated into laterally adjacent webs.

In cases of a constant fiber supply, the weight per unit area is influenced by varying the velocity of the perforated collection element, with the fiber orientation being substantially laminar. By "laminar" it is here understood that the fibres are oriented substantially parallel to a surface, usually the supporting surface thereof. In the course of the production of the mat, the entire air/gas quantity must pass through the mat under formation. Depending on the weight per unit area and the available evacuation area, different vacuum pressures are required in the evacuation.

BRIEF SUMMARY

The invention starts out from this known production of primary mats. It was realized that so-called inhomogeneities are unavoidable in mat formation in any of the known fiberization processes. This may be a matter of inhomogeneities in wool distribution, with a reduced mineral wool quantity coming to lie in some locations, and an increased mineral wool quantity in others. Moreover imperfections such as lumps of binder or improperly fiberized glass particles lead to reductions in quality.

In addition inhomogeneities of binder distribution may occur, such as repeatedly wetted agglomerates that repeatedly entered into the binder spraying range owing to backflows, or flake bundles having passed too quickly through the spraying range. Such locations of insufficient or enriched binder are conspicuous in the final product through e.g. a different coloration. In order to obtain the full functionality of bonding, a larger quantity of binder than theoretically necessary must be added owing to the inhomogeneous distribution of the binder.

The inhomogeneous wool distribution may moreover lead to locally different weight per unit area values of the mat, resulting from spots having different bulk densities. Such fluctuations in wool distribution have a negative effect on quality features, such as in particular the thermal conduction resistance (i.e.inverse thermal conductivity), but also the mechanical strength. Particularly in cases of low bulk densities, in which the areas having a further reduced bulk density may be recognized visually, the achievable minimum bulk density is raised by such inhomogeneities, if only to avoid visible imperfections such as "holes". As a result, in order to take these inhomogeneities of the wool distribution into account, it is necessary to operate with a higher average bulk density than would otherwise be required. This leads to higher production costs and thus to higher product costs, and to a reduction of the thermal conduction resistance owing to the higher bulk density. The result is a product that is altogether relatively more costly and has a quality different from the theoretically possible quality.

The invention is based on the object of providing a process for manufacturing mineral wool products wherein the effects of the inhomogeneities in the final product, which are inherent in the different production processes, are minimized to such an extent that optimum properties of the resulting types of products may be obtained at a lowest possible input of mineral wool, wherein it should advantageously be possible to manufacture multilayer products having different properties of the single layers, and high-quality monolayer products.

In accordance with one embodiment of the invention, the mineral wool material of the primary mat is mechanically comminuted from its state integrated into the mat into separate mineral wool flakes. These are then again collected for formation of the final mat such that the mineral wool material is isotropic in the final mat. "Isotropic" here is understood to mean that a theoretically separated individual element of the final mat, e.g. a cube, has identical properties, such as strain resistance etc, in all spacial directions. When determining "identical" properties in all spacial directions it has certainly to be taken into account that mineral wool consists or randomly arranged and oriented fibres so that statistical variations may occur inherently.

The manufacture of such a product is advantageously achieved by comminuting the mineral wool material through the action of a combined beating and cutting process.

From U.S. Pat. No. 3,050,427 a process for manufacturing a composite product of foamed material and mineral fibers is known, wherein a primary mat of glass fibers is mechanically decomposed and subsequently combined with the foam material while in the process of foaming so as to form a board-type final product. The teaching of this document is to achieve the objective of reinforcing foamed products by as many reinforcing fibers in the form of glass wool as possible, for which purpose a primary mat of glass wool is decomposed by means of carding cylinders, and the foamable material is admixed concurrently with this process step.

In comparison with this prior art, the present invention pursues an entirely different aim: starting point is a preferably laminar primary mat of mineral wool which is purposely decomposed into individual mineral wool flakes in order to subsequently obtain an improved product which structurally again is exclusively made up of mineral wool. For this concept it was surprisingly realized that by a particular decomposition of the primary mat, preferably by a combined beating and cutting process, individual mineral wool flakes are obtained which provide, upon renewed collection into a final mat, a product which has a lower bulk density in comparison with the primary mat, but still possesses at least the same insulation und strength parameters as the primary mat. This means reduction of bulk density without loss of quality.

Purposeful decomposition of the primary mat into particular mineral wool flakes may be achieved according to one embodiment of the invention if, during the beating and cutting process, prongs of different shapes are used which are part of strips arranged on the periphery of a cylinder in parallel with the axis thereof, and which, during the decomposition process, mesh while guarding a spacing with corresponding projections of a depressing element for the primary mat. Here it is suitable if the primary mat is supplied to the beating and cutting process via a conveyor means, in particular a conveyor belt, such that it is forcibly guided between the conveyor belt and the depressing element, with the conveyor belt and the depressing element suitably extending toward each other in a conical configuration.

The prongs of the strip provided on the cylinder may alternatingly have the form of beating fingers and cutting knives, the beating fingers and cutting knives being equipped at their surfaces of impact with a highly wear-resistant coating so as to minimize wear that may be caused by glass-type mineral wool fibers. The prongs having the form of cutting knives, on the other hand, may alternatingly have different sizes and have their conical tips oriented in the direction of the cylinder radius, to thereby create gaps of different sizes for the matching part in form of alternating sliding fingers and rod-type conveyor elements. Here the sliding fingers should be rigidly provided on the depressing element and each reach into the vicinity of the smaller cutting knives, whereas the rod-type conveyor elements in the form, e.g., of endless revolving chains, should extend into the vicinity of the larger cutting knives.

As a result of using the beating fingers, the mineral wool flakes generated by decomposition are advantageously pre-compacted to a certain degree, with such pre-compacting possibly amounting to more than 50% relative to the density of the primary mat, e.g., an increase in bulk density from originally 30 kg/m³ to 50 kg/m³. It was moreover realized that the size of the produced mineral wool flakes is of relevance for obtaining an isotropic structure in the final mat; it was determined through many experiments that the mineral wool flakes should preferably have a mean dimension in radial direction of 10 to 30 mm, in particular of 15+/−5 mm.

Determination of the sizes of the produced mineral wool flakes showed that the use of exceedingly large mineral wool flakes tends to impair the strength of the final mat, for the individual flakes may then have portions with a laminar fiber structure originating from the primary mat, which ranges in this case do not have the desired isotropic character, i.e., these mineral wool flakes do not behave identically under e.g. identical loads from all directions. On the other hand, the bulk density of the final mat is increased if the produced mineral wool flakes are selected to be too small in their mean radial dimension.

In addition, the mineral wool flakes are deposited randomly during recombination of the mineral wool material for formation of the final mat, so that this random or chaotic distribution counteracts a renewed formation of inhomogeneities. Thus this results in a deposition in the final mat which avoids the inhomogeneities technically inherent in a deposition in the chute, and accordingly in a considerably more homogeneous product. Moreover one obtains a final mat which has a lower bulk density at an approximately identical compressive strength and at an approximately identical thermal insulation capacity as the primary mat, which is a substantial economic advantage.

The effects of the invention may also be utilized for the manufacture of binder-free mineral wool products such as wire mats or needled felt. If, however, a binder is added to the mineral wool fibers during the manufacture of the primary mat, the advantages of the process in accordance with the invention also take effect, for it also serves to homogenize the binder distribution, which particularly has an advantageous effect on the strength properties of the product.

In the conventional process for the manufacture of mineral wool products, it is frequently aspired to replace the laminar fiber orientation with another fiber orientation that results in better product properties, particularly as regards strength. Thus mineral wool boards having a laminar fiber orientation have—precisely because of this fiber orientation—low strength against tensile and compressive forces at the major surface, which forces tend to compress the board, or tear it open. Mechanical properties such as compressive strength and tearing strength are therefore improved, or values demanded in this respect are already obtained at a lower bulk density, if a considerable portion of the fibers extends perpendicular to the plane of production. What is moreover employed for this purpose is upsetting or crimping the fibers in an upsetting or crimping station. In this process step, the fibers predominantly having a horizontal orientation in the plane of production are, prior to curing of the binder, partly oriented in the vertical direction. This results in an uncontrolled, random undulation of the fibers in the longitudinal direction and particularly in the thickness direction of the product, and thus in their re-orientation, whereas only a minimum "pulling" of the fiber strands or "chains" takes place in the width direction, with the fibers substantially remaining in their laminar relative position. Re-orientation of the fibers upon crimping thus only occurs in two dimensions, similar to parallel surface waves on a liquid having the previously flat liquid surface just arched with the elements thereon, however, otherwise remaining in the same relative position if viewed in the longitudinal direction of the wave.

Such an effect may in the process in accordance with the invention be achieved as well. Due to the fact that the mineral wool flakes having essentially chaotic fiber orientation are deposited in the final mat in a substantially chaotic manner, approximately identical fiber proportions are present in all of the main directions of the product. Thus, in contrast with a very fine separation down to single fibers, the fibers are prevented from again assuming one preferred fiber orientation upon collection as a final mat. In this way it is thus for the first time possible, owing to the chaotic deposition, to produce a product upset or crimped so-to-say in three dimensions, with an orientation of approximately identical fiber proportions in all three main directions.

It is moreover known and desired for many mineral wool products to produce zones of different bulk densities in the product so as e.g. to allow for higher loads on the product surface. Here either a part of the primary mat is separated (split) off and subjected to a compression process, crimping or some other consolidation, and then again combined with the basic mat, or in turn a mat produced in a separate chute is combined with a basic mat following a corresponding processing. In the latter case, the mat produced in the separate chute may have different properties, such as a higher binder content.

Insofar it is also advantageously provided in accordance with the invention that the final mat having the isotropic structure is combined with at least one more mineral wool material having, e.g., the form of a mat, in order to form a composite product. In the most simple case, the produced mineral wool flakes of the primary mat may simply be deposited on the further mineral wool material which optionally is of a different type, and together with the latter be subjected to further processing steps such as compacting and/or crimping and/or curing.

There is a multiplicity of possibilities of combination with additional mineral wool layers and of treatments of the individual layers, be it individually and/or in combination. In this way it is possible to produce composite products having very different properties of the layers, such as a composite product with an inner mineral wool body and at least one stable external protective layer, with the latter not differing substantially from the basic body in its bulk density.

Thus it is possible, e.g., to produce the primary mat in a separate chute with a higher content of binder and/or other reinforcing substances in comparison with the further mineral wool material, and then combine it with the latter. Hereby the strength of the top layer thus obtained may be increased even further though at an approximately identical bulk density.

As was demonstrated above, the process of the invention above all provides in a simple manner a possibility of manufacturing multilayer products known as "bidensity" boards, which are particularly employed in flat roofs and facades/front walls. The product according to the invention is characterized by a layer having an isotropic fiber structure and a layer having a laminar fiber structure, with the layer having the isotropic fiber structure exhibiting a higher compressive strength than the other layer.

Furthermore, products are possible which have a board-type shape and consist of only one layer having an isotropic fiber structure and may be employed in the flooring field as so-called impact sound insulation boards.

BRIEF DESCRIPTION OF THE DRAWINGS

Further details, features and advantages of the invention become evident from the following description of embodiments while making reference to the drawings wherein.

Figure 1:
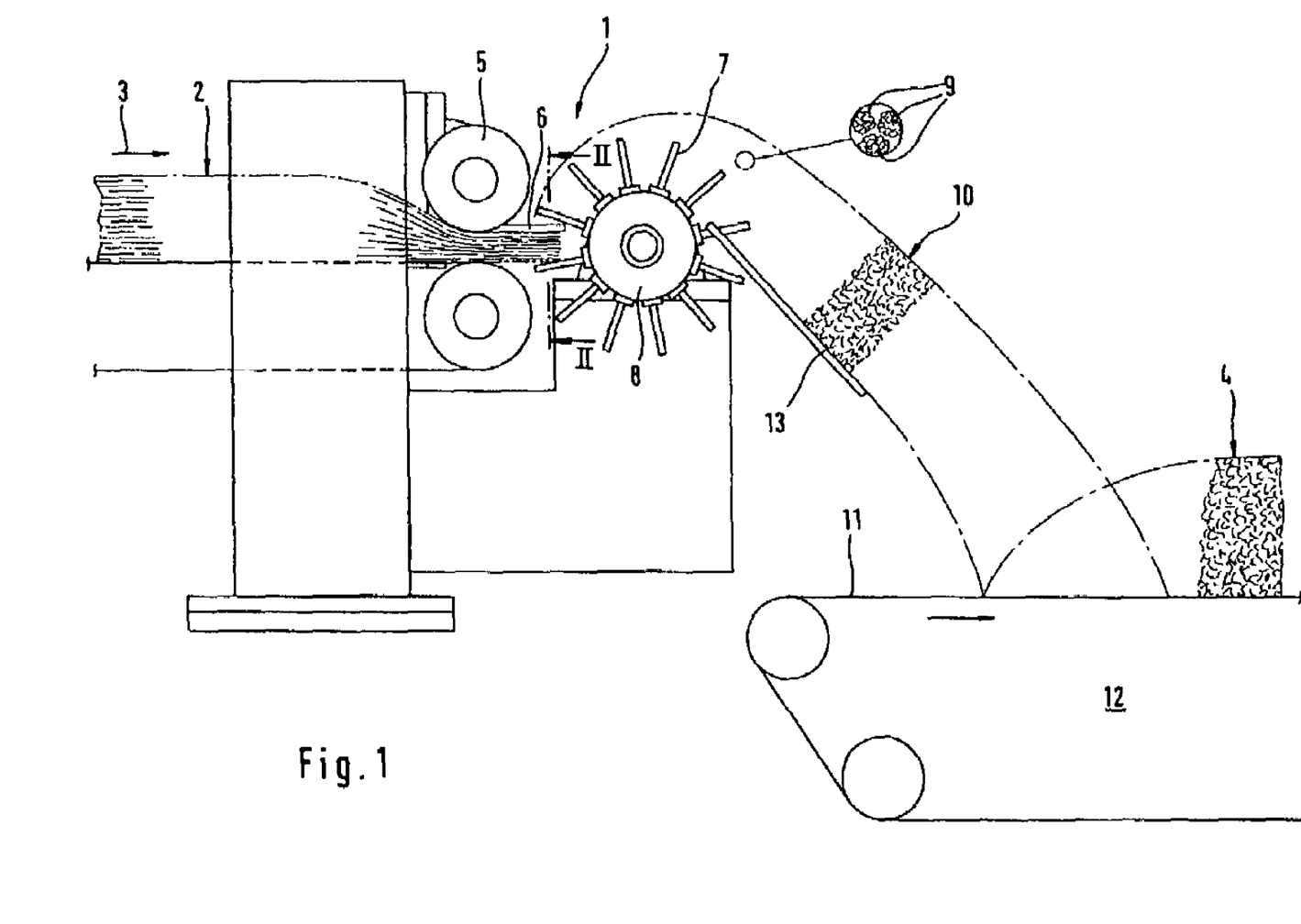
FIG. 1 shows, in side view, a generalized representation of the process of an exemplary embodiment of the invention as carried out by a decomposition station therefore.

In FIG. 1 a station generally designated by 1 for comminuting mineral wool material of a primary mat 2 is represented. This decomposition station 1 is arranged between a, relative to the conveying direction, see arrow 3, upstream fiberizing station and a downstream curing oven. The fiberizing station and the curing oven may have any known construction and are therefore not represented in detail.

The primary mat 2 is manufactured in the fiberizing station in which mineral fibers produced from a molten material are deposited by a large-volume conveying gas/air flow on a perforated element subjected to negative pressure, such as sieve, which is continually moved in the production direction. This results in a fiber deposition in the primary mat 2 where the mineral fibers are predominantly arranged in parallel with the surface of support and thus in a basically "horizontal" position, i.e. parallel to the major surfaces of the primary mat 2. Such fiber deposition is termed "laminar."

In the exemplary case, it may be assumed that in order to produce a bonded mineral wool product, a binder has been added to the fiber flow prior to collection on the perforated element. The binder is cured in a downstream customary curing oven to thus give the mineral wool product its stable final shape. Between fiberizing station and curing oven the binder is still in the uncured state, and the fibers still possess relative mobility among each other and may thus be influenced in the sense of a reorientation. For this purpose it is known to "crimp" or "upset" the mineral wool material by increasingly decelerating the surfaces of the primary mat 2 in a crimping station so that the fibers begin to stand up under this crimping pressure, and a greater number of them is given a main direction perpendicular to the major surfaces of the product. Hereby the strength of the product against surface pressure and surface pull is clearly enhanced while, however, flexural strength in turn is reduced.

It is moreover known to superpose several primary mats or to continuously superpose sections of the same primary mat on one another prior to entrance into the curing oven. This allows to produce each primary mat having only small thickness under optimized conditions of production, and to subsequently combine it into a more complex, thicker product. The properties of layers or strata of composite products may thereby be influenced in a specific way as desired. The fundamentally laminar fiber deposition is not modified by this. Where necessary, crimping may be applied.

In accordance with the invention the decomposition station 1 is arranged between fiberizing station and curing oven. In this decomposition station the mineral wool material of the primary mat 2 is mechanically comminuted, i.e., individualized from being integrated in the mat and transformed into mineral wool flakes which are then deposited anew in order to form a final mat 4.

To this end, the primary mat 2 when entering the decomposition station 1 is being compressed by a rotating pressing element 5 and is held in the compressed state by a depressing element 6. In this position an individualization of the mineral wool material from the compound of the primary mat 2 is effected with the aid of prongs 7 of a flake-forming cylinder 8 that reach through between the depressing element 6, which prongs act on the primary mat 2 from below and individualize it between gaps of the depressing element 6 forming mineral wool flakes 9.

The fiber flow, designated by 10 and containing individual mineral wool flakes 9 is in this embodiment of the invention directed to a floor-side perforated transport belt 11 and deposited thereon. In the space 12 underneath the transport belt 11 evacuation of air is effected so that the fiber deposition on the transport belt 11 is assisted by a large-volume air flow. Insofar the fiber deposition on the transport belt 11 resembles the one on the perforated element in the fiberizing station.

In accordance with the invention, relatively compact flakes are produced in the decomposition station 1, which also have already been subjected to a certain pre-compacting, in comparison with the bulk density in the primary mat 2, through the action of the prongs 7 meshing with the depressing element 6, the deposition of the flakes occurring with a random orientation. Therefore, the fiber orientation in the final mat 4 is chaotic, i.e., isotropic. In the embodiment contemplated the material having this isotropic orientation may, after a corresponding further pre-compression not shown here in any detail, arrive at the curing oven in which the binder is cured. Depending on need, it is also possible to influence the fibers in any other way, such as by crimping, before the curing oven.

At the bottom side of the fiber flow 10 a guide element 13 may be arranged which guides, in its downstream portion, the fiber flow 10 towards its deposition site on the transport belt 11, and by its upstream end is supported in a manner not represented in detail, and extends in between the prongs 7 of the flake-forming cylinder 8 so as to prevent a formation of fiber accumulations in this location.

Moreover it is possible to introduce additives such as hydroxides or foreign fibers into the loose fiber flow 10 in order to produce or support desired properties.

Just like in mat formation in the fiberizing station, the mat forming organ comprising the transport belt 11 may in a manner not represented in detail be provided with lateral walls known per se and having an adjustable mutual distance for lateral guidance and delimitation of the final mat 4. The mat forming organ may moreover be provided with a device for influencing the wool distribution, either directly associated or positioned downstream of the mat forming organ. Particularly in cases of low weight per unit area of the final mat 4 such device may further homogenize the wool in order to further homogenize any inhomogeneities of the wool distribution possibly having appeared during deposition from the fiber flow 10, or, on the other hand, to bring about a desired wool distribution. To this end, the wool distribution may be influenced through locally varying evacuation power, or also through air lances or mechanical action, all this depending on demand.

As is readily evident, such decomposition stations 1 may repeatedly be used in the section between fiberizing station and curing oven. A decomposition station 1 may first of all be applied wherever a crimping station had hitherto been provided. It may furthermore homogenize each single primary mat by itself and reshape it isotropically, after which the final mats 4 thus formed, like primary mats 2, may then be superposed or deposited on top of each other. It is, however, also possible to convey additional mineral wool material, in the form of a further primary mat 2 or final mat 4, on the transport belt 11, and to form the final mat 4 as another layer on its top side.

The process according to the invention thus does nowhere limit the applicability of known techniques, but expands the known techniques by the possibility of supplying any mat— whether pre-processed in accordance with the invention, or otherwise pre-processed, or not pre-processed at all—to a decomposition station 1 as a primary mat 2 and thus in any case homogenize it, and reshape it into isotropic fiber orientation.

Figure 2:
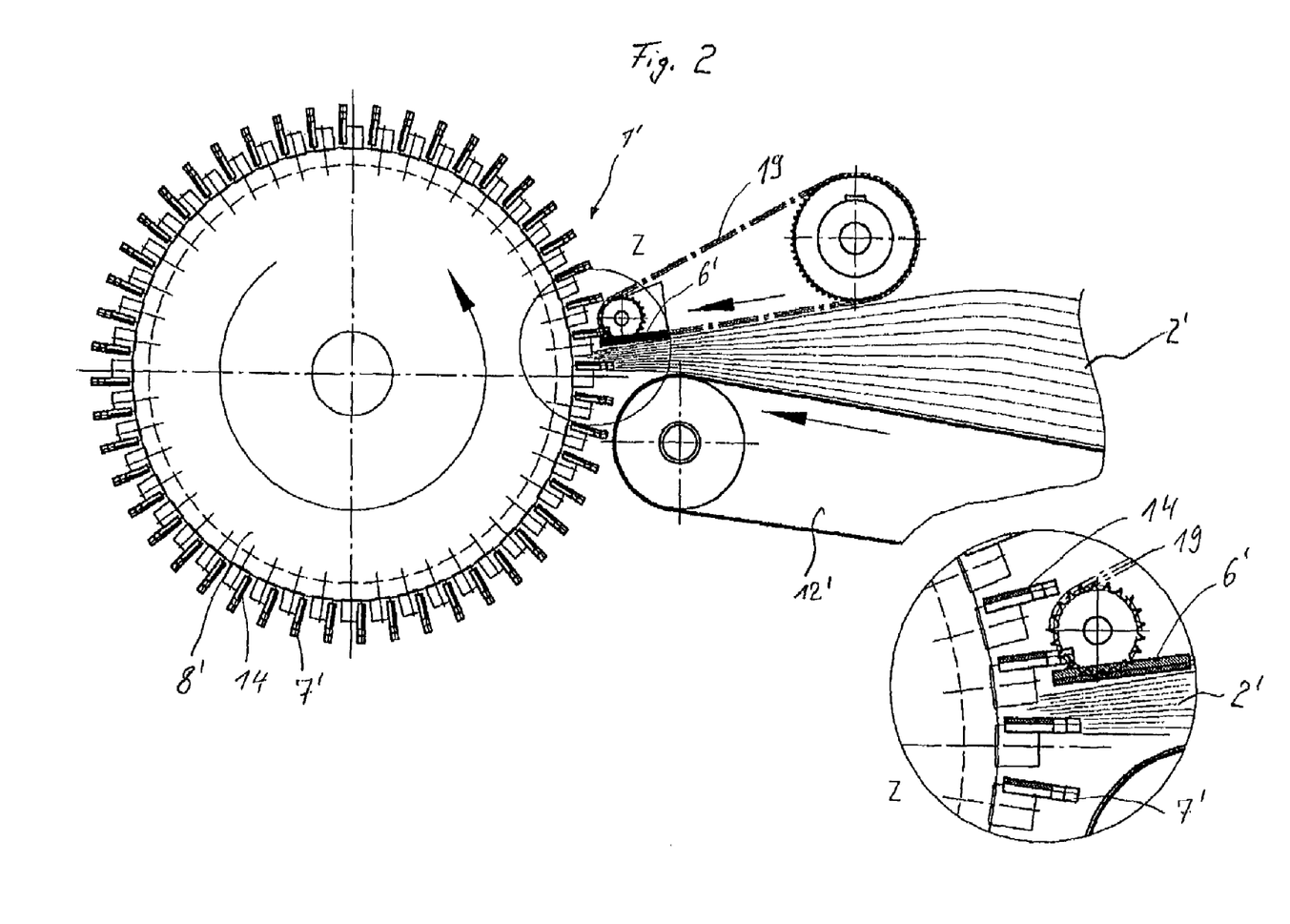
FIG. 2 shows, in side view, a detail of the beating and cutting process of a preferred embodiment including a detail "Z"
Figure 2A:
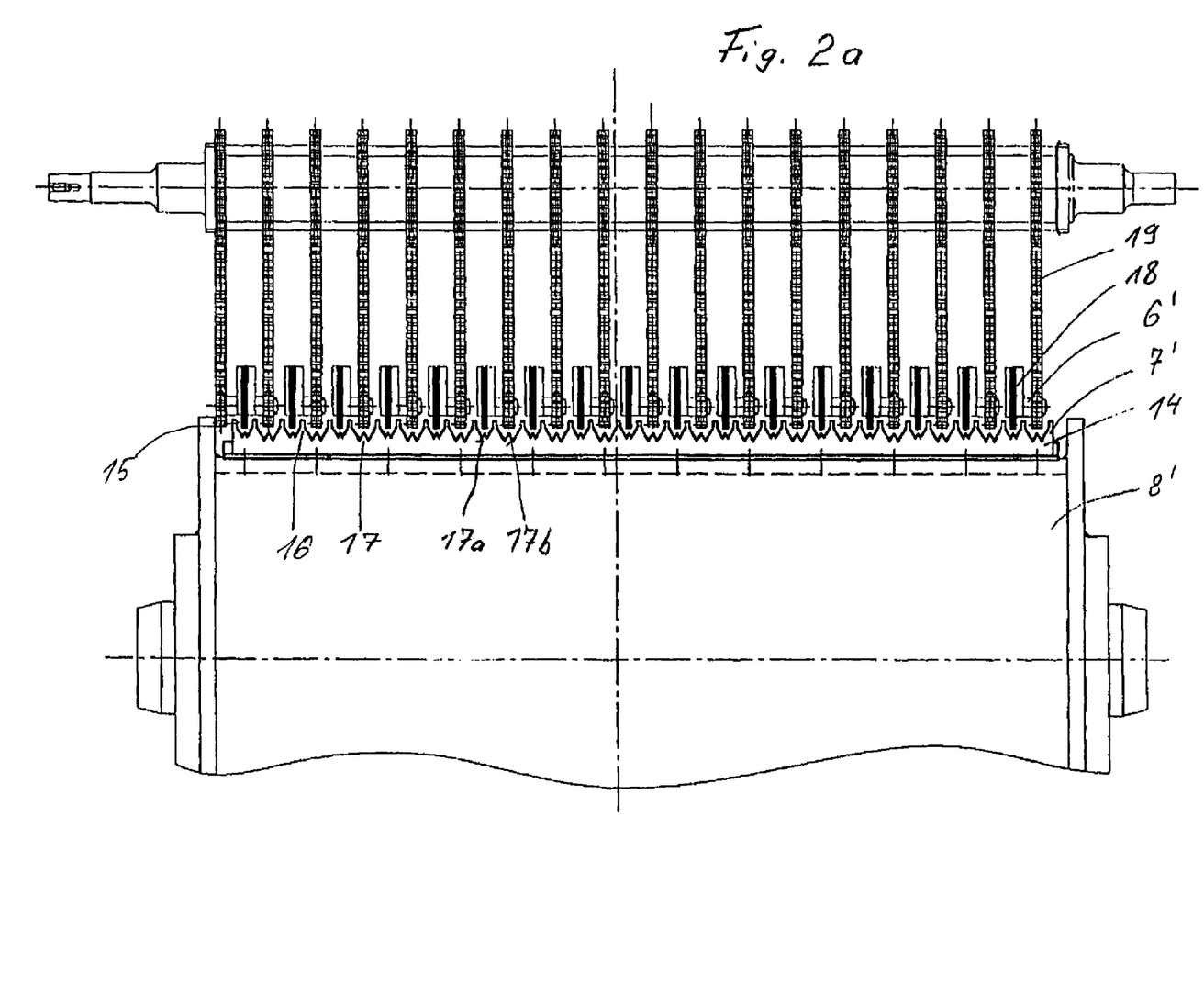
FIG. 2a shows the decomposition station of FIG. 2 in plan view.

The detail of a preferred decomposition station 1' represented in FIGS. 2 and 2*a* shows in side view a flake-forming cylinder 8' having on its periphery a multiplicity of strips 14 arranged at a regular distance and extending in parallel with the axis of the cylinder, which strips are provided at their free ends with prongs 7'. The prongs 7' mesh with a depressing element 6' at a spacing 15 so as to allow for the formation of the mineral wool flakes 9 (not represented). The spacing 15 is clearly visible in FIG. 2*a* and may be adjusted in its dimension.

The primary mat designated by 2' is supplied to the beating and cutting process with the aid of a conveyor belt 12' and of a depressing element 6', the conveyor belt 12' and the depressing element 6' extending toward each other in a conical, tapered configuration narrowing in the direction of transport so that the primary mat 2' is forcibly guided.

The prongs 7' of the strip 14 alternatingly have the form of beating fingers 16 and a kind of cutting knives 17, being equipped at their beating and cutting surfaces with a highly wear-resistant coating. The cutting knives 17 in turn alternatingly have different sizes—17*a*, 17*b*—and have their conical tips oriented radially with respect to the flake-forming cylinder 8'.

The depressing element 6' in turn has alternatingly arranged rigid sliding fingers 18 each extending into the vicinity of the smaller, radially relatively protruding cutting knives 17*a*, and rod-type conveyor elements 19 having the form of endless revolving chains extending into the vicinity of the larger, radially relatively inner cutting knives 17*b*.

During the actual beating and cutting process for producing the mineral wool flakes 9, the primary mat 2' is forcibly supplied via the conveyor belt 12' and the depressing element 6' to the flake-forming cylinder 8' in accordance with the arrows indicated in FIG. 2 in the direction of transport, while the flake-forming cylinder 8' is driven counterclockwise as represented in FIG. 2 at about 1,000 revolutions per minute, which amounts to a peripheral velocity of 32 meters per minute at a cylinder diameter of 800 mm. In the course of this decomposition and comminution of the mineral wool material of the primary mat 2' into mineral wool flakes 9 there results, particularly through the beating fingers 16, a certain pre-compaction or pre-compression of the mineral wool flakes 9. This pre-compaction may amount to more than 50% of the density of the primary mat 2', thus e.g. effecting an increase of the bulk density in the primary mat 2' of 25 kg/m$^3$ to a bulk density of 50 kg/m$^3$ in the mineral flakes 9. A preferred mean extension or dimension of the mineral wool flakes 9 of 15+/−5 mm may be obtained so that the final mat 4 (not represented) is given an isotropic fiber structure. In view of the initial bulk arrangement of the pre-compacted mineral flakes 9 on the transport conveyor 11, the final mat 4 advantageously exhibits a lower bulk density than the primary mat 2', however at otherwise approximately identical parameters (thermal conductivity, mechanical strength).

Figure 3:
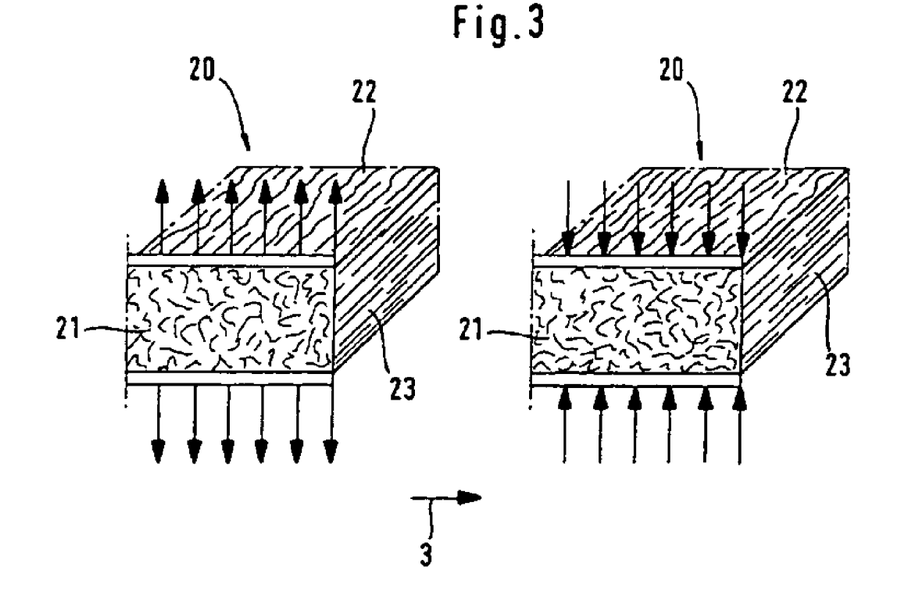
FIG. 3 shows a diagrammatic representation of a crimped product in accordance with the prior art under tensile and compressive strains.

In FIG. 3 a conventionally crimped board is represented diagrammatically under surface pull and surface pressure, respectively. As is indicated in the drawing, the crimping, depending on the kind of installation utilized for crimping, results in a different structure at the lateral surface shown at 21 of the product 20, which was produced in a production direction in accordance with arrow 3. Depending on the installation used, the structure of the lateral surface 21 ranges from a distinct wave shape to a largely accidental random orientation as represented in FIG. 3. Such a largely accidental random orientation at the lateral surface 21 may be obtained, e.g., with a high-performance crimping installation in accordance with EP 1 144 742 B1, the contents of which are fully incorporated herein by reference with regard to further details.

On the major surfaces 22, in contrast, only a more or less distinct undulation is recognizable which originates from the crimping cylinders or crimping belts that introduced the crimping forces via these surfaces.

At the end faces shown at 23 of the product 20, which are obtained when boards are cut from the cured mineral wool web in transverse direction to the direction of production, in contrast, a laminar deposition of the fibers is still recognizable. All the forces occurring during crimping only acted perpendicular to this end face 23, so that fiber strands or "chains" situated transversely to the production direction (see arrow 3) may have been rotated or upset so that fibers extending in the production direction (see arrow 3) may have been oriented in the vertical direction. However fibers of the laminar product extending transversely to the production direction (see arrow 3) were not influenced in their orientation. Insofar the product 20 is still laminar after crimping when viewed across its end-face in width direction, i.e. at the end face 23.

The product 20 has to be designed for certain surface pull and surface pressure loads to which it is subjected in use. In order to attain these strengths, a certain bulk density must be used, for the product increases in strength with a higher bulk density. In order to obtain, e.g., a surface pull strength of 30 kN/m$^2$, a necessary bulk density of 130 kg/m$^3$ in the product 20 may be assumed for the purpose of this example. In order to obtain a surface pressure strength of 60 kN/m$^2$, a necessary bulk density of 160 kg/m$^3$ may be assumed. Increased bulk density results in increased material consumption and thus in increased costs, and above a bulk density of about 50 to 70 kg/m$^3$ it results in a reduction of thermal conduction resistance owing to an increased number of the thermal bridges on the fibers and thus in a quality reduction.

Figure 4:
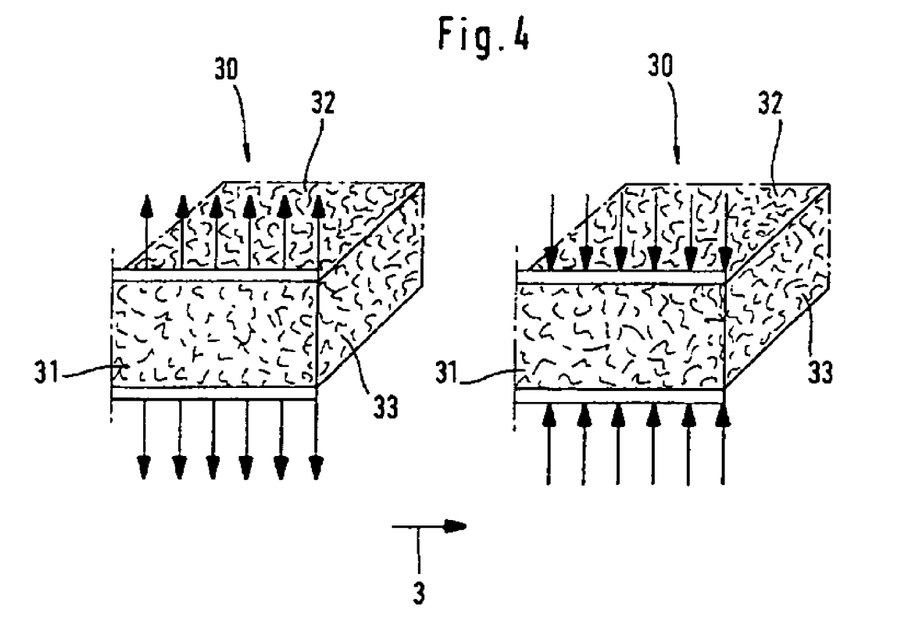
FIG. 4 shows a representation corresponding to FIG. 3 of a product produced in accordance with an exemplary embodiment of the invention.

In FIG. 4 an exemplary product 30 obtained in accordance with the invention is shown in a representation corresponding to FIG. 3. The product 30 was obtained through mechanical decomposition or comminution of a primary mat for the formation of flakes as well as recombination of the flakes into a final mat 4 which was pre-compressed in a desired manner and then cured in the curing oven while being compressed to its final thickness.

In the single mineral wool flakes 9 the fibers are predominantly present in a non-parallel arrangement, but have orientations as they result from the interaction of the prongs 7' with the depressing element 6'. In the fiber flow 10 the flakes are moved relative to each other and finally deposited accidentally on the transport belt 11 for the formation of the final mat 4. In this way the previously laminar fiber deposition of the primary mat 2 was reoriented to an entirely accidental, isotropic fiber deposition in the final mat 4. After compressing the final mat 4, the individual mineral wool flakes 9 are not discernible any more in the final mat 4, but the deposited mass of flakes has become a homogeneous and integral new structure.

Visually this may be ascertained from the fact that the fibers at lateral surface 31, major surface 32 and end face 33 are arranged entirely accidentally. Whereas in crimping in accordance with FIG. 3 a merely two-dimensional reorientation of the fibers is obtained which essentially has no influence on the width direction, with the invention in accordance with FIG. 4 there is obtained a completely three-dimensional reorientation which fully encompasses all three main directions.

Through this isotropic orientation of the fibers and their freedom from inhomogeneities, a surface pull strength of 30 kN/m$^2$ results at a same binder content as in a crimped board in accordance with FIG. 3 already at a bulk density of about 95 kg/m$^3$, and a surface pressure strength of more than 60 kN/m$^2$ already at a bulk density of about 105 kg/m$^3$. This accordingly results in a reduction of the bulk density of more than 25%, and due to the reduced material consumption in a corresponding reduction of the product costs.

On the other hand, improved quality ensues due to improved thermal conduction resistance: At identical dimensions and other parameters of the products in accordance with FIG. 3 and FIG. 4 there resulted in the product manufactured according to the invention in accordance with FIG. 4 a thermal conductivity reduced by 4 to 5 mW/(m*K). Apart from the homogeneous consistency of the product manufactured in accordance with the invention according to FIG. 4, the improvement of the thermal conductivity also results from the fact that the reduction of the bulk density above the optimum value of about 50 to 70 kg/m$^3$ generally leads to a reduction of the heat conduction through the fibers and thus to an increase in thermal conduction resistance.

At low bulk densities below about 50 kg/m$^3$, the thermal conductivity inevitably rises again, for at a lower bulk density the inclusion of air not undergoing convection is less and less successful. It is a known fact that products do not insulate by the insulating material itself but by the "still" air enclosed by the insulating material. Whereas at high bulk densities conduction through the insulating material itself becomes more and more prominent and increases the thermal conductivity, this does not play an important role any more at low bulk densities, but in turn the inclusion of a still air cushion of necessity is less and less successful.

Figure 5:
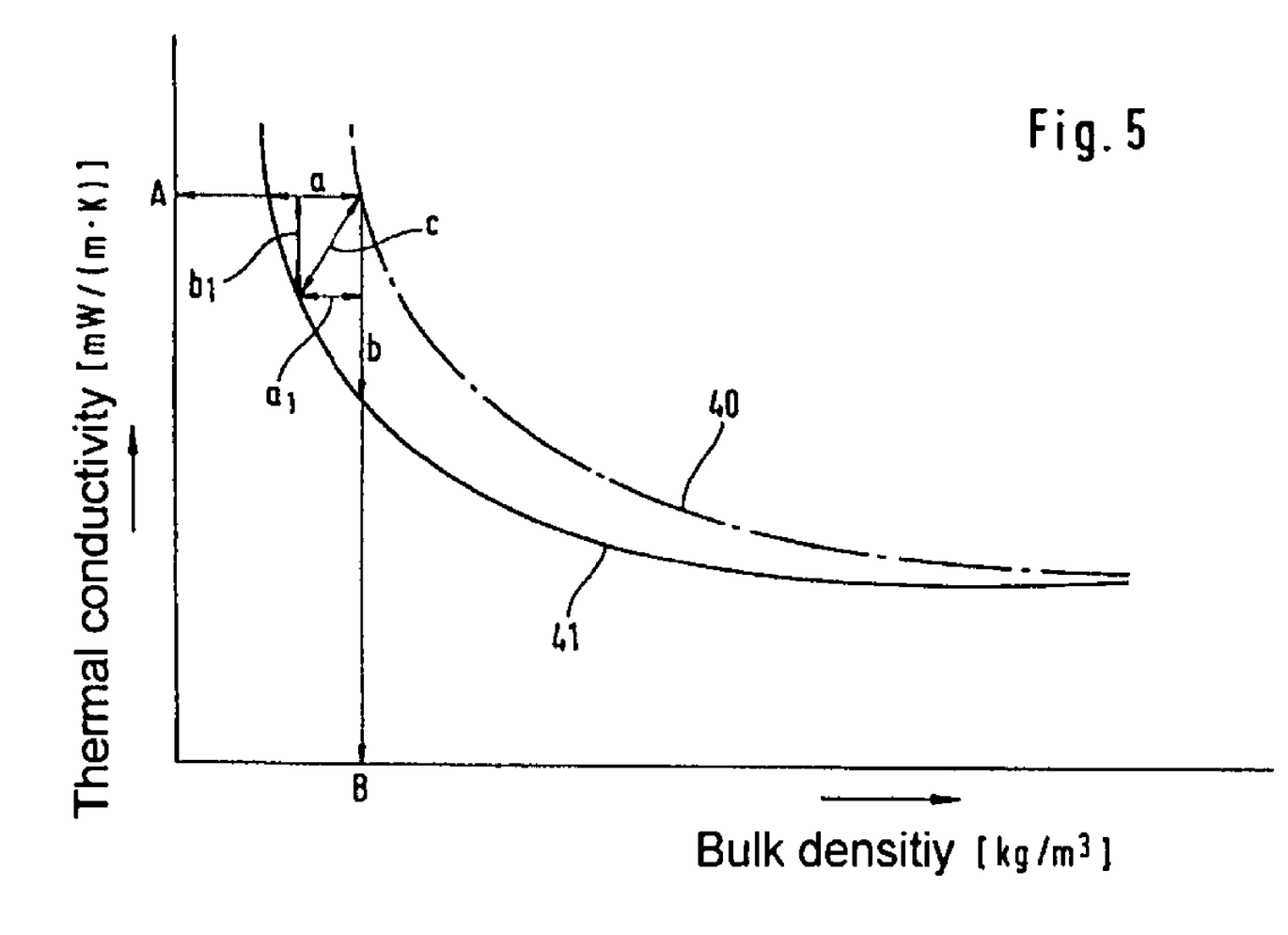
FIG. 5 is a graphic representation of the thermal conductivity vs. bulk density.

This is visualized more closely in the graphic representation in accordance with FIG. 5. Curve 40 shown there in dash-dotted line shows a typical behaviour of thermal conductivity over bulk density in laminar mineral wool material manufactured by internal centrifugation. In contrast, curve 41 shown by a solid line visualizes the corresponding behaviour in a material manufactured in accordance with the invention, i.e. a material having been homogenized with isotropic fiber structure by purposeful decomposition of the material, this material otherwise having identical parameters as the wool material of curve 40. As may be seen from this, a point "A" of identical thermal conductivity in material manufactured in accordance with the invention is shifted by an amount "a" in the direction of reduced bulk density. This means that products that were hitherto not capable of getting below a certain bulk density for attaining a desired thermal conductivity value may in accordance with the invention be manufactured with a comparatively reduced bulk density, which leads to corresponding savings. Especially in the case of materials having a high bulk density as used, e.g., in flat roof insulation, any admissible lowering of the bulk density amounts to a considerable economic advantage due to the high production quantities.

The admissible lowering of the bulk density in lightweight materials essentially results through the homogenization of wool and binder distribution in the product that is obtained in accordance with the invention. This approaches the product more and more to its theoretical ideal condition, and it is not necessary to operate with excess material just to have sufficient material present even at imperfections.

Conversely it is, however, also possible in accordance with FIG. 5 to operate at a point "B" of an identical bulk density. In this case there results an improvement "b" of the thermal conductivity value, and thus a considerable improvement of the heat insulation properties and possibly a better thermal conductivity classification at an identical material consumption.

Finally it is also possible both to reduce the bulk density by a value "$a_1$" that is reduced in comparison with value "a", and also to improve the thermal conductivity by a value "$b_1$" that is reduced in comparison with value "b", as is shown in FIG. 5 by arrow "c". This is recommendable for instance when the improvement of the thermal conductivity by the value "$b_1$" is already sufficient for attaining a desired better thermal conductivity classification, so that a further lowering of the thermal conductivity is not necessary any more, and it is possible instead to save bulk density by means of the value "$a_1$" to the extent this is still available.

An essential further field of application of the present invention lies in composite products, with a use of the invention at least being possible whenever conventionally crimping processes were employed.

Figure 6:
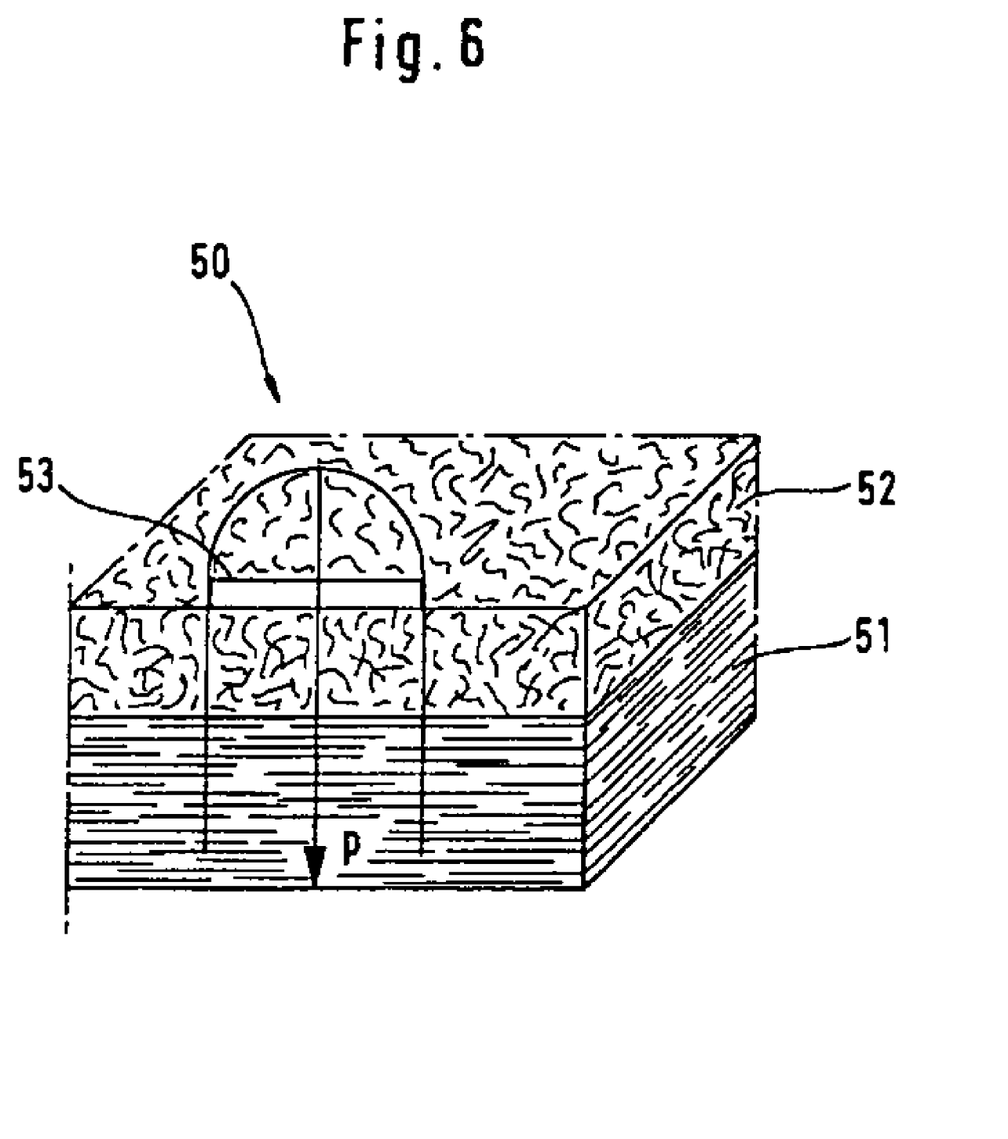
FIG. 6 shows, in a representation corresponding to FIGS. 3 and 4, a product produced in accordance with an exemplary embodiment of the invention and having a consolidated surface layer.

Such a composite product is represented in FIG. 6 as product 50. Such a product, for instance a facade insulating board, comprises a laminar insulating layer 51 as well as a consolidated surface layer 52. The consolidated surface layer 52, customarily a crimped board having a relatively high bulk density, serves for protecting the insulating layer 51 against forces applied in small area spots. In the case of a facade insulating board these forces are applied by retainer dowels which hold the facade insulating board against the building wall with the consolidated surface layer facing outside, and which hold it against gravity and wind forces. For reasons of installation complexity it should be attempted to require as few dowels as possible.

In such a case considerable shear forces occur in the consolidated surface layer in the range of the edges of the dowel plate indicated at 53. The dowel pull-through resistance of the facade insulating board results from the capability of the consolidated surface layer 52 to absorb these shear forces at the dowel edges.

When the consolidated surface layer 52 is conventionally manufactured of a crimped board, the latter does in fact contain a multiplicity of fibers extending in the thickness direction which avoid a depression of the consolidated surface layer in the range of the dowel plate 53 (mattress effect). However there is only a very limited strength against shear forces at the dowel edges as such fibers may rather easily be shifted relative to each other under forces also acting in thickness direction. Accordingly very high bulk densities and comparatively high thicknesses of the consolidated surface layers 52 are required, which leads to an increased thickness requirement of the entire facade insulating board owing to the very reduced thermal conduction resistance of the consolidated surface layer.

If, as is diagrammatically visualized in FIG. 6, the consolidated surface layer 52 is manufactured in accordance with the invention by purposeful decomposition and comminution of a primary mat 2 in order to form mineral wool flakes 9 and by recombination thereof into a final mat 4, then the three-dimensional, isotropic fiber deposition results in an orientation of the fibers in all directions. In this way on the one hand enough fibers are present which counteract a depression (mattress effect), however also sufficiently fibers extend crosswise to the shear forces introduced in the vicinity of the dowel edges to thus properly receive them. Thus the dowel pull-through resistance, i.e. the dowel force whereby the consolidated surface layer 52 is pushed or pulled over the dowel plate 53, was measured on a product corresponding to product 50, once with a crimped consolidated surface layer and once with a consolidated surface layer 52 flaked in accordance with the invention, at identical binder contents and bulk densities. This comparative test showed in the case of the crimped consolidated surface layer a dowel pull-through force of more than 500 N, in the case of the consolidated surface layer 52 produced in accordance with the invention, however, a dowel pull-through force of nearly 1,000 N.

Thus with a consolidated surface layer 52 manufactured in accordance with the invention, the required dowel pull-through force is attained already at a considerably reduced thickness and/or bulk density, which accordingly leads to a reduction in material consumption and a concurrent improvement of the insulation effect.

Moreover, inhomogeneities exist in a consolidated surface layer of crimped material. These consist, for instance, of regions of higher and lower binder contents, and thus harder and softer spots. Moreover the bulk density may also be subject to considerable local variations. Such inhomogeneities have the result that the local capability of absorbing shear forces drops drastically. Thus when such a variation of density comes to lie in the vicinity of a dowel edge, the dowel may tear through although the dowel pull-through resistance of the whole board as measured at many other locations is sufficient. For this reason dowel pull-through resistance in the crimped board has to be increased as a precaution in order to still have sufficient dowel pull-through resistance even for the case that the dowel comes to sit in a weak spot. This in turn leads to higher required thicknesses or bulk densities of the consolidated surface layer.

Hard "skins" produced in accordance with the invention are considerably more homogeneous owing to the decomposition and the accompanying dissolution of inhomogeneities in the primary mat 2, while having virtually no imperfection spots. Both the binder distribution and the wool distribution are considerably more homogeneous. Thus the dowel pull-through resistances at different places of a facade insulating board varies only to an inessential extent so that it is not necessary to, just as a precaution, increase the dowel pull-through resistance in order to compensate for weak spots. This is an additional reason why consolidated surface layers 52 manufactured in accordance with the invention can satisfactorily work with thicknesses and/or bulk densities even further reduced in comparison with the above explanations.

In addition to a composite product, it is also possible to manufacture products of mineral wool, in particular of rock wool, which just exhibit an isotropic fiber structure. A typical application are so-called impact sound insulation boards or flat roof insulation boards, which latter may be crimped in two or three dimensions in order to further increase their compressive strength.

What is claimed is:

1. A process for manufacturing products of mineral wool, wherein initially at least one primary mat having a laminar fiber structure is produced, which is then further processed into a final mat, said process comprising:
   mechanically comminuting or decomposing mineral wool material of a primary mat into mineral wool flakes, and subsequently collecting the mineral wool flakes and using the collected flakes to form a final mat where the mineral wool material exhibits isotropic properties after its renewed collection in the final mat; and
   wherein the primary mat is supplied via a conveyor to a beating and cutting process such that it is forcibly guided between a conveyor belt and a depressing element to effect said comminuting or decomposition.

2. The process of claim 1, wherein, during the beating and cutting process, prongs of varying shapes, which are part of strips arranged on the periphery of a flake-forming cylinder in parallel with an axis thereof, mesh with corresponding projections of the depressing element for the primary mat leaving a space therebetween.

3. The process of claim 1, wherein the conveyor belt and the depressing element extend toward each other in a conical configuration narrowing in a direction of transport.

4. The process of claim 2, wherein the prongs alternatingly have the form of beating fingers and cutting knives.

5. The process of claim 4, wherein the beating fingers and the cutting knives are equipped at their surfaces of impact with a highly wear-resistant coating.

6. The process of claim 4, wherein the cutting knives alternatingly have different sizes while each having their conical tips oriented radially with respect to the flake forming cylinder.

7. The process of claim 1, wherein the depressing element is alternatingly formed by rigid sliding fingers each reaching into the vicinity of the smaller cutting knives and by rod-type conveyor elements reaching into the vicinity of the larger cutting knives.

8. The process of claim 7, wherein the rod-type conveyor elements are formed by endless revolving chains.

9. The process of claim 1, wherein, during decomposition of the mineral wool material of the primary mat into mineral wool flakes, a pre-compaction of the mineral wool flakes is effected by means of beating fingers.

10. The process of claim 9, wherein the pre-compaction of the mineral wool flakes amounts to more than 50% relative to the density of the primary mat.

11. The process of claim 1, wherein the mineral wool flakes have a mean dimension of 10 to 30 mm.

12. The process of claim 11, wherein the mineral wool flakes have a mean dimension of 10 to 20 mm.

13. The process of claim 1, wherein the final mat has a lower bulk density than the primary mat.

14. The process of claim 1, wherein the final mat having an isotropic structure is combined with at least one further mineral wool mat.

15. The process of claim 14, wherein the combination of the final mat and the further mineral wool mat is jointly subjected to a crimping process.

16. The process of claim 14, wherein the further mineral wool mat has a laminar fiber structure.

* * * * *